US010763680B2

(12) United States Patent
Toya et al.

(10) Patent No.: US 10,763,680 B2
(45) Date of Patent: Sep. 1, 2020

(54) BATTERY PACK AND CONTROL METHOD OF BATTERY PACK BASED ON A USAGE CONDITION

(71) Applicant: Panasonic Intellectual Property Management Co., Ltd., Osaka (JP)

(72) Inventors: Shoichi Toya, Hyogo (JP); Yutaka Iwahori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 296 days.

(21) Appl. No.: 15/227,290

(22) Filed: Aug. 3, 2016

(65) Prior Publication Data

US 2017/0063111 A1 Mar. 2, 2017

(30) Foreign Application Priority Data

Aug. 28, 2015 (JP) .................................. 2015-169772

(51) Int. Cl.
*H02J 7/00* (2006.01)

(52) U.S. Cl.
CPC .......... *H02J 7/0029* (2013.01); *H02J 7/0045* (2013.01); *H02J 7/0063* (2013.01); *H02J 7/00306* (2020.01)

(58) Field of Classification Search
CPC .. H02J 7/0026; H02J 7/007; H02J 2007/0096; G06Q 30/06; G06Q 50/10
See application file for complete search history.

(56) References Cited

U.S. PATENT DOCUMENTS

| 9,972,047 | B1* | 5/2018 | Elliott | G06Q 30/02 |
| 2003/0069805 | A1* | 4/2003 | Yui | G06Q 20/102 |
| | | | | 705/26.1 |
| 2005/0088147 | A1* | 4/2005 | Svensson | H02J 7/0031 |
| | | | | 320/134 |
| 2012/0242278 | A1 | 9/2012 | Simonazzi | |
| 2014/0368156 | A1* | 12/2014 | Aloe | H02J 7/0003 |
| | | | | 320/106 |
| 2015/0333377 | A1* | 11/2015 | Davila | H01M 10/425 |
| | | | | 429/50 |
| 2016/0087314 | A1 | 3/2016 | Arashima et al. | |
| 2016/0099590 | A1* | 4/2016 | Velderman | H02J 7/0045 |
| | | | | 320/113 |

FOREIGN PATENT DOCUMENTS

| CN | 2904428 Y | 5/2007 |
| CN | 102656736 A | 9/2012 |

(Continued)

OTHER PUBLICATIONS

English Translation of Chinese Search Report dated Mar. 31, 2020 for the related Chinese Patent Application No. 201610674310.0.

*Primary Examiner* — Drew A Dunn
*Assistant Examiner* — Sailesh Thapa
(74) *Attorney, Agent, or Firm* — Greenblum & Bernstein, P.L.C.

(57) ABSTRACT

A battery pack includes a battery, a suspension unit that establishes or breaks an electrical connection between the battery and an external device, and a control unit that controls the suspension unit to break the electrical connection between the battery and the external device when a usage state of the battery pack does not satisfy a usage condition.

20 Claims, 7 Drawing Sheets

(56) References Cited

FOREIGN PATENT DOCUMENTS

| | | | |
|---|---|---|---|
| GB | 1512066.0 | * | 7/2015 |
| JP | 2003-288539 | | 10/2003 |
| JP | 2004-126669 | | 4/2004 |
| JP | 2011-118638 | | 6/2011 |
| JP | 2013-232129 | | 11/2013 |
| JP | 2014-204657 A | | 10/2014 |
| JP | 2014-215792 A | | 11/2014 |
| KR | 20160123835 | * | 4/2015 |
| KR | 20170006419 | * | 7/2015 |
| WO | 2014/167889 A1 | | 10/2014 |
| WO | WO-2017006125 A1 | * | 1/2017 ............ H02J 7/0004 |

\* cited by examiner

| MEMBER ID | BATTERY PACK ID | RETURN DUE DATE | RETURN DATE | UPDATE DUE DATE | USAGE AMOUNT | USAGE TEMPERATURE |
|---|---|---|---|---|---|---|
| 00001 | 001001 | 2015/8/15 | | 2015/8/7 | 600 | HIGH |
| 00002 | 001002 | 2015/7/31 | | 2015/8/9 | 200 | MID |
| 00003 | 001003 | 2015/9/30 | | 2015/8/6 | 5 | LOW |
| 00004 | 001004 | 2015/10/1 | | 2015/8/12 | 300 | MID |
| 00005 | 001005 | 2015/10/1 | | 2015/8/12 | 100 | MID |

| MEMBER ID | POINTS | EXPIRATION DATE |
|---|---|---|
| 00001 | 5000 | 2016/1/1 |
| 00002 | 10000 | 2016/1/1 |
| 00003 | 0 | |
| 00004 | 5000 | 2016/1/1 |
| 00005 | 3000 | 2016/1/1 |

BATTERY PACK AND CONTROL METHOD OF BATTERY PACK BASED ON A USAGE CONDITION

BACKGROUND

1. Technical Field

The present invention relates to a battery pack, and a control method of the battery pack.

2. Description of the Related Art

Battery packs have been used heretofore to supply electric power to electric bicycles, electric scooters, electric automobiles, and so forth. There has been proposed a rental service to rent battery packs to users. Japanese Unexamined Patent Application Publication No. 2003-288539 discloses a battery pack billing system where the user is billed in accordance with the usage state of the rental battery pack.

However, there have been cases in the related art where rented battery packs are not used appropriately. Effectively providing the battery pack rental service becomes difficult if the battery packs are not appropriately used.

SUMMARY

One non-limiting and exemplary embodiment provides a battery pack and battery pack control method where inappropriate use of battery packs can be suppressed.

In one general aspect, the techniques disclosed here feature a battery pack including a battery, a suspension unit that establishes or breaks an electrical connection between the battery and an external device, and a control unit that controls the suspension unit to break the electrical connection between the battery and the external device when a usage state of the battery pack does not satisfy a usage condition.

The battery pack and battery pack control method according to an aspect of the present disclosure can suppress inappropriate use of battery packs.

It should be noted that general or specific embodiments may be implemented as a system, a method, an integrated circuit, a computer program, a storage medium such as a computer-readable CD-ROM or the like, or any selective combination a system, a method, an integrated circuit, a computer program, and a storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of a first management table according to an embodiment;

FIG. 5 is a diagram illustrating an example of a second management table according to an embodiment;

DETAILED DESCRIPTION

Figure 1:
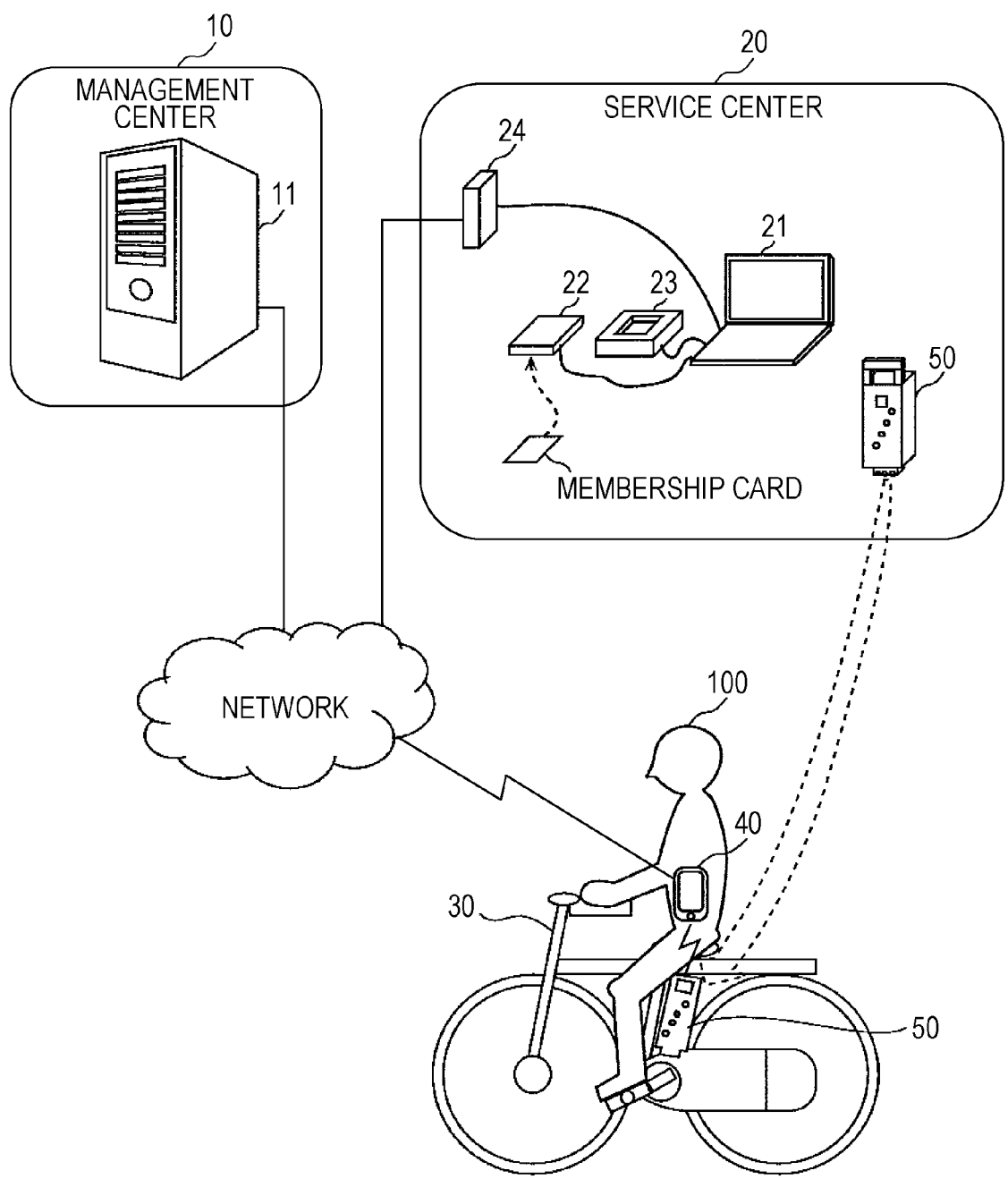
FIG. 1 is a diagram illustrating an overall image of a rental service provided by a rental system according to an embodiment.

A battery pack according to one aspect of the present disclosure includes a battery pack including a battery, a suspension unit that establishes or breaks an electrical connection between the battery and an external device, and a control unit that controls the suspension unit to break the electrical connection between the battery and the external device when a usage state of the battery pack does not satisfy a usage condition.

According to this configuration, in a case where the usage state of the battery pack does not satisfy the usage condition of the battery pack, usage of the battery pack can be suspended. That is to say, the user can be penalized if rules relating to usage of the battery pack are not kept. Accordingly, a situation where the usage state of the battery pack does not satisfy the usage condition can be suppressed, and inappropriate usage of the battery pack can be suppressed.

For example, the control unit may cause the suspension unit to maintain breaking the electrical connection between the battery and the external device.

According to this configuration, in a case where the usage state of the battery pack does not satisfy the usage condition of the service for the battery pack, discharging of the battery pack can be stopped while discharging, and thereafter starting discharging not being permitted even if there is a discharge start request. That is to say, discharging of the battery pack can be stopped while discharging, if rules relating to usage of the battery pack are not kept. Usage of the electric equipment to which the battery pack has been mounted is strictly restricted, so inappropriate usage of the battery pack can be strongly suppressed.

For example, the control unit may cause the suspension unit to maintain establishing the electrical connection between the battery and the external device during discharging of the battery pack.

According to this configuration, in a case where the usage state of the battery pack does not satisfy a usage condition of the battery pack, discharging can be not permitted even if there is a discharge start request, but discharging of the battery pack that is currently discharging is not stopped. That is to say, discharging of the battery pack can be forbidden from the next time, if rules relating to usage of the battery pack are not kept. Accordingly, inappropriate usage of the battery pack can be suppressed, while avoiding danger to the user of the electric equipment due to discharging of the battery pack being stopped while discharging.

For example, the control unit may cause the suspension unit to maintain breaking the electrical connection between the battery and the external device.

According to this configuration, in a case where the usage state of the battery pack does not satisfy a usage condition of the battery pack, charging can be not permitted even if there is a charge start request. That is to say, charging of the battery pack can be forbidden if rules relating to usage of the battery pack are not kept. In other words, discharging of the electric power already stored in the battery pack is permitted, so the battery pack can be gradually guided to stopping discharging. Accordingly, inappropriate usage of the battery pack can be suppressed, while avoiding inconvenience to the user.

For example, the usage condition may include that a return due date for the battery pack does not lapse or the battery pack is returned by the return due date.

According to this configuration, returning the battery pack by the return due date of the battery pack can be used as the usage condition. Accordingly, occurrence of a situation where the battery pack is not returned by the return due date can be suppressed.

For example, the control unit may controls the suspension unit to maintain establishing the electrical connection between the battery and the external device as long as the battery pack is used beyond a recommended usage amount for the battery pack within a predetermined period.

According to this configuration, a user who uses the battery pack beyond the recommended usage amount does not have usage suspended even after the return due date, so the trouble of returning is reduced and the battery pack can still be used, thereby enabling usage of battery packs to be promoted.

For example, the usage condition may include that an update due date of information indicating the state of the battery pack does not lapse or the information indicating the state of the battery pack is transmitted to a server device by the update due date.

According to this configuration, transmitting information indicating the state of the battery pack to the server device by the update due date of the battery pack can be used as a usage condition. Accordingly, occurrence of a situation where information indicating the state of the battery pack is not transmitted by the update due date can be suppressed.

For example, the usage condition may include that the battery pack is used beyond a recommended usage amount for the battery pack within a predetermined period.

According to this configuration, using the battery pack beyond a recommended usage amount within a predetermined period can be used as a usage condition. Accordingly, occurrence of a situation where the battery pack is only used a little can be suppressed. That is to say, usage of the battery pack can be promoted.

For example, the usage condition includes that a user of the battery pack has points necessary to use the battery pack where the points are usable as usage fees for the battery pack.

According to this configuration, occurrence of a situation where the user cannot pay the usage fee due to insufficient points, when using points as the usage fee for the battery pack, can be suppressed.

For example, the points may be invalidated after an expiration date of the points.

According to this configuration, points can be invalidated when the expiration date of the points expires, so appropriate point management can be realized.

For example, the battery pack may further include a warning unit that warns the user, the control unit causing the warning unit to warn the user before controlling the suspension unit to break the electrical connection between the battery and the external device.

According to this configuration, the user can be warned before suspending usage of the battery pack. Accordingly, usage state of the battery pack can be improved before the usage state of the battery pack no longer satisfies the usage conditions of the battery pack, and inappropriate use of the battery pack can be suppressed.

For example, the battery pack may further include a warning unit that warns the user, the control unit causing the warning unit to warn the user by standby of starting of discharging when there is a discharge start request for the battery pack before controlling the suspension unit to break the electrical connection between the battery and the external device.

According to this configuration, the user can be warned by standby of starting discharging when there is a discharge start request of the battery pack, thereby enabling the warning to be communicated to the user in a surer manner.

For example, the battery pack may further include a first communication unit that acquires information from a server device via an information terminal. The information indicating that the usage state does not satisfy the usage condition. The control unit controls the suspension unit to break the electrical connection between the battery and the external device in response to the acquired information.

According to this configuration, information indicating that the usage state does not satisfy the usage conditions can be acquired from the server device via the information terminal by using first communication unit. That is to say, the battery pack can acquire information from the server device using the communication functions of the information terminal. As a result, acquisition of information from the server device can be realized with less electric power consumption than in a case where the battery pack receives information from the server device without going through the information terminal. This is because communication with the information terminal using Near Field Communication (NFC) such as Bluetooth (a registered trademark) or the like consumes less electric power as compared with a case of directly communicating with the server device using long-distance wireless communication such as Long Term Evolution (LTE) or the like.

For example, the first communication unit may communicate with the information terminal by NFC.

According to this configuration, the first communication unit can communicate with the information terminal by NFC. Accordingly, acquisition of information from the server device can be realized more easily, using NFC functions that the information terminal such as a smartphone or the like commonly has.

For example, the battery pack may further include a second communication unit that acquires information from a server device. The information indicating that the usage state does not satisfy the usage condition. The control unit controls the suspension unit to break the electrical connection between the battery and the external device in response to the acquired information.

According to this configuration, information indicating that the usage state does not satisfy the usage conditions can be acquired from the server device by using the second communication unit. That is to say, the battery pack can acquire information from the server device without going through the information terminal. Thus, information can be acquired from the server device even when the battery pack cannot communicate with the information terminal, and acquisition of information from the server device can be performed in a surer manner.

It should be noted that general or specific embodiments may be implemented as a system, a method, an integrated circuit, a computer program, a storage medium such as a computer-readable CD-ROM or the like, or any selective combination a system, a method, an integrated circuit, a computer program, and a storage medium.

Embodiment

An embodiment will be described in detail with reference to the drawings. It should be noted that the embodiment is a general or specific exemplification. Values, shapes, materials, components, placements and connection states of components, steps, order of steps, and so forth, in the embodiment are only exemplary, and do not restrict the present disclosure. Components in the following embodiments which are not included in an independent Claim indicating the highest concept are described as being optional components.

Also note that the drawings are schematic diagrams, and are not necessarily created precisely to scale. Configurations in the drawings that are substantially the same are denoted by the same reference numerals. Redundant description may be omitted or simplified.

Overall Image of Rental Service

FIG. 1 is a diagram illustrating the overall image of a rental service provided by a rental system according to the embodiment. A management center 10 manages the rental services of a battery pack 50 to a user 100. The management center 10 has a server device 11. The server device 11 communicates via network with a processing device 21 of a service center 20 that will be described later, and the battery pack 50, and manages data regarding the user 100 and battery pack 50. The server device 11 is, for example, a cloud server.

At the service center 20, the battery pack 50 is rented to the user 100, and the rented battery pack 50 is returned from the user 100. The service center 20 also inspects the battery pack 50 and charges the battery pack 50. The service center 20 includes a processing device 21, a card reader 22, an inspection device 23, and a relay device 24.

The processing device 21 communicates with the server device 11 of the management center 10 via network, and performs data processing for the rental service. For example, the processing device 21 transmits an identifier of the user 100 and an identifier of the battery pack 50 to the server device 11 when the battery pack 50 is being rented and returned.

The card reader 22 reads out the identifier of the user 100 from a membership card, and outputs to the processing device 21. The membership card and card reader 22 are, for example, an integrated circuit (IC) card and IC card reader.

The membership card stores an identifier for identifying the user 100, who is a member of the rental service. The membership card is issued to the user 100 from the business operator that runs the rental service by the user 100 being registered as a member. Hereinafter, the identifier stored in the membership card will be referred to as "membership ID".

The inspection device 23 acquires the identifier of the battery pack 50 from the battery pack 50, and outputs to the processing device 21. Hereinafter, the identifier of the battery pack 50 will be referred to as "battery pack ID".

The inspection device 23 further inspects the battery pack 50 returned from the user 100, and outputs the inspection results to the processing device 21. The inspection device 23 inspects the discharge capability and charging capability of the battery pack 50, for example.

The relay device 24 relays communication between the processing device 21 and the server device 11. The relay device 24 is a router, for example.

Electric equipment 30 is a load device to which the battery pack 50 can be mounted, and which consumes electric power. Specific examples of the electric equipment 30 include an electric bicycle, electric scooter, electric automobile, and the like. Note that the electric equipment 30 is not restricted to a mode of transportation. The battery pack 50 rented at the service center 20 is mounted to the electric equipment 30. Thus, electric power is supplied from the battery pack 50 to the electric equipment 30.

An information terminal 40 relays communication between the battery pack 50 and the server device 11. An example of the information terminal 40 is a smartphone. The information terminal 40 transfers data received from the battery pack 50 to the server device 11. The information terminal 40 also transfers data received from the server device 11 to the battery pack 50.

The battery pack 50 supplies electric power to the electric equipment 30 by discharging, when mounted to the electric equipment 30. The battery pack 50 also stores electric power by being charged when connected to a charger (omitted from illustration).

Configuration of Battery Pack

Figure 2:
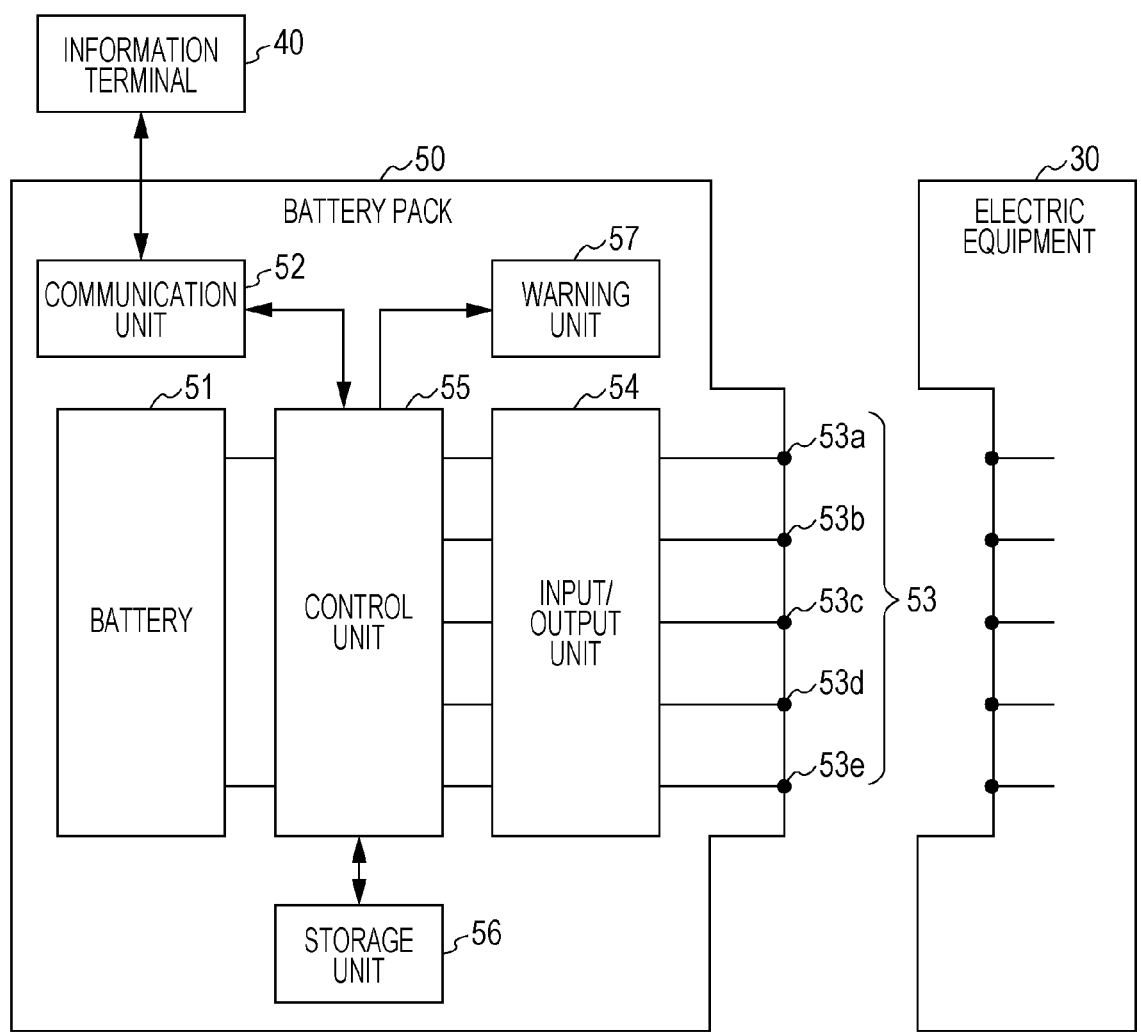
FIG. 2 is a block diagram illustrating the configuration of a battery pack according to an embodiment.

Now, the configuration of the battery pack according to the embodiment will be described in detail with reference to FIG. 2. FIG. 2 is a block diagram illustrating the configuration of the battery pack 50 according to the embodiment. The battery pack 50 includes a battery 51, a communication unit 52, multiple terminals 53, an input/output unit 54, a control unit 55, a storage unit 56, and a warning unit 57.

The battery 51 is also called a "secondary battery", and is a battery capable of charging/discharging. Examples of the battery 51 include lithium-ion batteries, lithium polymer batteries, and nickel-hydrogen batteries.

The communication unit 52 is an example of a first communication unit that communicates with the information terminal 40. The communication unit 52 in the embodiment communicates with the information terminal 40 by NFC. A specific example of the communication unit 52 is communication adapter for NFC. An example of the NFC is Bluetooth (a registered trademark). Note however, that the NFC is not restricted in particular, and other examples that may be used include wireless LAN, infrared (IR) communication, and so forth.

The multiple terminals 53 are electric contact points with external devices, and are provided to a connector (omitted from illustration) for physical and electrical connection between the battery pack 50 and external devices. The multiple terminals 53 include a discharge terminal 53a, a charging terminal 53b, a communication terminal 53c, an ID terminal 53d, and a ground terminal 53e. The external devices are devices external to the battery pack 50, examples of which include the electric equipment 30, the inspection device 23, a charger (omitted from illustration), and so forth. The connector does not have to have all of the multiple terminals 53; it is sufficient to have at least the discharge terminal 53a and the charging terminal 53b. The connector detachable connects to the external devices.

The discharge terminal 53a is connected to the battery 51 via the input/output unit 54, and is a terminal for discharging of the battery 51. That is to say, the battery pack 50 supplies electric power to an external device via the discharge terminal 53a.

The charging terminal 53b is connected to the battery 51 via the input/output unit 54, and serves as a terminal to charge the battery 51. That is to say, the battery pack 50 charges the battery 51 with electric power via the charging terminal 53b.

The communication terminal 53*c* is a terminal for communicating with external devices. For example, the battery pack 50 transmits the battery pack ID stored in the storage unit 56 to the inspection device 23 via the communication terminal 53*c*.

The ID terminal 53*d* is a terminal for identifying the type of external device. For example, when a terminal of an external device is connected to the ID terminal 53*d*, the battery pack 50 determines whether or not the external device is a load device based on whether or not the ID terminal 53*d* is grounded. The ground terminal 53*e* is a terminal that is grounded.

The input/output unit 54 is an example of a suspension unit that suspends usage of the battery pack 50. The input/output unit 54 switches electric connection between an external device and the battery 51 off and on. Specifically, the input/output unit 54 includes a switchover switch that switches the path between the discharge terminal 53*a* and the battery 51 between a conducting state and a non-conducting state. The input/output unit 54 further includes a switchover switch that switches the path between the charging terminal 53*b* and the battery 51 between a conducting state and a non-conducting state. The switches are realized by, for example, field-effect transistors (FET).

The control unit 55 controls charging and discharging of the battery 51 by controlling the input/output unit 54. The control unit 55 also controls the communication unit 52 to control communication with the information terminal 40.

Note that the control unit 55 may be realized in any way, as long as control functions are had. For example, the control unit 55 may be configured using dedicated hardware. Alternatively, the control unit 55 may be realized by executing software programs suited for realizing the components. In this case, the control unit 55 may include a computation unit (omitted from illustration) and a storage unit (omitted from illustration) that stores control programs, for example. Examples of the computation unit include a micro processing unit (MPU) and a central processing unit (CPU). An example of the storage unit is memory. Note that the control unit 55 may be configured as an independent control unit that performs centralized control, or as multiple control units that collaborate to perform decentralized control.

In the present embodiment, when the usage state of the battery pack 50 does not satisfy the usage conditions of the rental service of the battery pack 50, the control unit 55 controls the input/output unit 54 to suspend usage of the battery pack 50. Suspending usage of the battery pack 50 means to forbid at least one of charging and discharging of the battery pack 50. That is to say, the control unit 55 penalizes the user 100 by forbidding charging and/or discharging of the battery pack 50, depending on the usage state of the battery pack 50. This will be described later in detail with reference to FIG. 8.

The storage unit 56 is semiconductor memory, a hard disk drive, or the like, for example, and stores data or information. The storage unit 56 according to the present embodiment stores battery pack IDs. The storage unit 56 further stores information indicating the state of the battery pack 50. Hereinafter, information indicating the state of the battery pack 50 will be referred to as "state information". The state information of the battery pack 50 is transmitted to the server device 11 via the communication unit 52 and information terminal 40.

Examples of state information of the battery pack 50 include the amount of usage of the battery pack 50, the number of times charged, the number of times discharged, learning capacity, usage temperature, and so forth. The state information of the battery pack 50 may also include abnormality history information such as temperature abnormality, electric current abnormality, voltage abnormality, shock abnormality, and so forth.

The warning unit 57 warns the user 100. The warning unit 57 may be a speaker that warns the user 100 by emitting sound, for example. Alternatively, the warning unit 57 may be a lamp that warns the user 100 by emitting light, for example. Further, the warning unit 57 may warn when there has been a request for starting discharge of the battery pack 50, by causing standby of starting of the discharge, for example.

Processing in Rental System

The processing in the rental system configured as described above will be described next in detail with reference to FIGS. 3 through 9.

Rental Processing of Battery Pack

Figure 3:
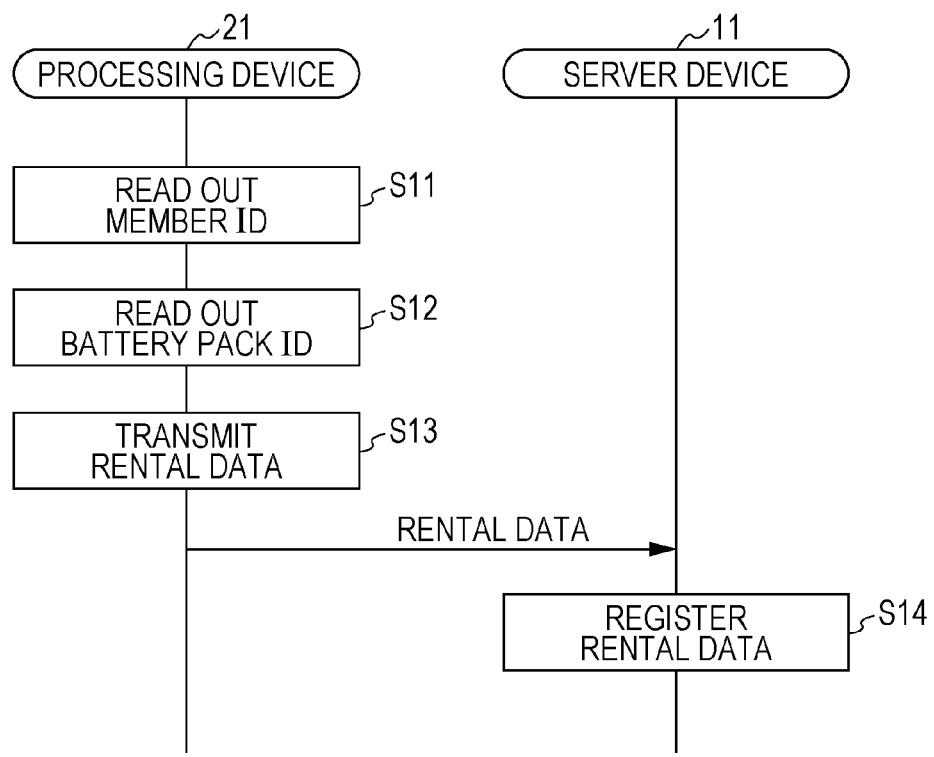
FIG. 3 is a diagram illustrating rental processing of a battery pack in the rental system according to an embodiment.

First, rental processing of the battery pack 50 will be described with reference to FIGS. 3 through 5. FIG. 3 is a diagram illustrating rental processing of the battery pack 50 in the rental system according to the present embodiment.

The user 100 presents a membership card at the service center 20 when using the rental service. The processing device 21 reads the membership ID from the membership card via the card reader 22 (S11). The processing device 21 further reads the battery pack ID from the battery pack 50 to be rented, via the inspection device 23 (S12). The inspection device 23 may inspect the battery pack 50 at this time.

The processing device 21 then transmits rental data to the server device 11 (S13). The rental data includes at least the membership ID and the battery pack ID. The processing device 21 may further transmit point data relating to points that can be used as usage fees for the battery pack 50. Point data includes the membership ID and the number of points to increment in correspondence with this membership ID, for example. The number of points corresponds to a monetary amount paid by the user 100.

The server device 11 receives rental data from the processing device 21, and registers the rental data in a management table (S14). The management table is included in a database (omitted from illustration) of the server device 11. The database of the server device 11 according to the present embodiment includes a first management table 11*a* for rental management of battery packs, and a second management table 11*b* for point management.

Examples of the first management table 11*a* and second management table 11*b* will be described here in detail with reference to FIGS. 4 and 5. FIG. 4 is a diagram illustrating an example of the first management table 11*a* according to the embodiment. FIG. 5 is a diagram illustrating an example of the second management table 11*b* according to the embodiment. The first management table 11*a* includes fields for member ID, battery pack ID, return due date, return date, update due date, usage amount, and usage temperature, as illustrated in FIG. 4.

The member ID and battery pack ID fields have the battery pack ID of the battery pack 50 and the member ID of the user 100 that has rented the battery pack 50 registered in a correlated manner. Each time rental data is received in the present embodiment, a new record is generated in the first management table 11*a*, with the member ID and battery pack ID included in the rental data being recorded in this record.

The return due data field has registered therein the return due date of the battery pack 50 that has been rented. For example, a return due date based on a rental period is registered in the return due data field at the time of the member ID and battery pack ID being registered. The rental period may be included in the rental data, for example, or may be a predetermined fixed period.

The date on which the rented battery pack 50 was returned is registered in the return date field. No valid data is registered in the return date field if the battery pack 50 has not been returned yet.

The due date on which state information of the battery pack 50 is to be transmitted from the battery pack 50 to the server device 11 is registered in the update due date. The update due date field is updated based on a predetermined update period when the server device 11 has received state information from the battery pack 50, for example.

Registered in the usage amount field is the usage amount of the rented battery pack 50 within a predetermined period. The usage amount is a value that quantitatively expresses the usage of the battery pack 50. The usage amount is, for example, the amount of electric power provided from the battery pack 50 to the electric equipment 30. Note that the usage amount is not restricted to amount of electric power, and may be the number of times charged while the battery pack 50 is rented, for example. This usage amount field is updated based on the usage amount that the sate information indicates with the server device 11 receives the state information from the battery pack 50.

The second management table 11b has registered in the usage temperature field the temperature of the battery pack 50 when the rented battery pack 50 is being used. The usage temperature is expressed by temperature range here. For example the usage temperature indicates what temperature the highest temperature of the battery pack 50 when being used is included in. The usage temperature field is updated as necessary, based on the temperature that the state information indicates when the server device 11 receives state information from the battery pack 50.

The second management table 11b includes member ID, points, and expiration date fields, as illustrated in FIG. 5. The member ID and point fields have the member ID of the user 100 and the points usable as usage feeds for the battery pack 50 registered, in a correlated manner. For example, the value in the points field is increased by the number of points in point data when the point data is received.

The expiration date field has registered therein expiration dates of the points. Once the expiration date for points expires, the points become invalid. That is to say, when the expiration date for points passes, the number of points is zero. The expiration date is updated following preset rules.

Transmission Processing of State Information of the Battery Pack

Figure 6:
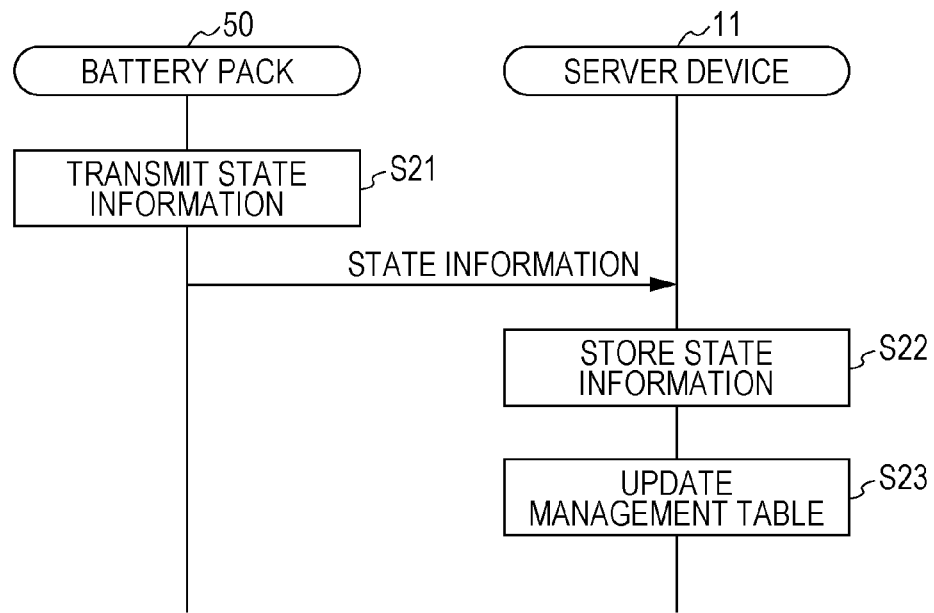
FIG. 6 is a diagram illustrating transmission processing of state information in the rental system according to an embodiment.

Next, transmission processing of state information of the battery pack 50 will be described with reference to FIG. 6. FIG. 6 is a diagram illustrating transmission processing of state information in the rental system according to the embodiment. An arrangement will be assumed here where state information of the battery pack 50 is temporarily stored in the storage unit 56 of the battery pack 50. This transmission processing may be performed at the timing of, for example, starting discharging of the battery pack 50, ending discharging, starting charging, ending charging, or the like. Alternatively, the transmission processing may be performed at a predetermined cycle.

First, the control unit 55 of the battery pack 50 reads out the battery pack ID and state information from the storage unit 56 of the battery pack 50, and transmits the battery pack ID and state information that have been read out to he information terminal 40 via the communication unit 52 (S21). The information terminal 40 transmits the battery pack ID and state information received from the battery pack 50 to the server device 11. Accordingly, the battery pack ID and state information are transmitted from the battery pack 50 to the server device 11. State information here includes at least usage amount and usage temperature.

Upon having received the battery pack ID and state information from the battery pack 50, the server device 11 stores this state information in a manner correlated with this battery pack ID (S22).

The server device 11 then updates the first management table 11a and second management table 11b based on the battery pack ID and state information that have been received (S23). Specifically, the server device 11 updates the usage amount and usage temperature corresponding to the battery pack ID that are included in the first management table 11a, based on the usage amount and usage temperature included in the state information. The server device 11 further identifies the member ID correlated with the battery pack ID that has been received by referencing the first management table 11a. The server device 11 then updates the points corresponding to the identified member ID that are included in the second management table 11b, based on the usage amount included in the state information. Specifically, the server device 11 subtracts points corresponding to the usage amount from the points included in the second management table 11b.

Usage Suspension Processing of the Battery Pack

Figure 7:
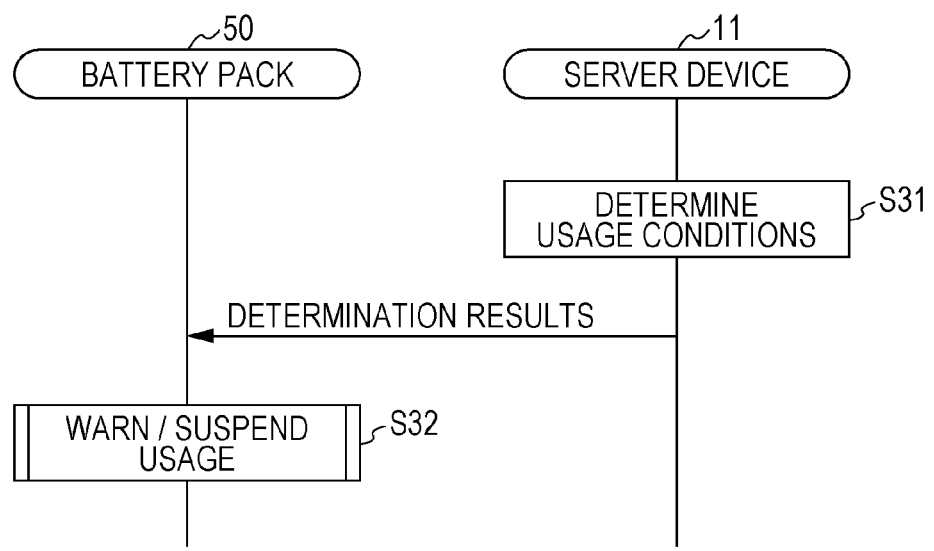
FIG. 7 is a diagram illustrating usage suspension processing of a battery pack in the rental system according to an embodiment.
Figure 8:
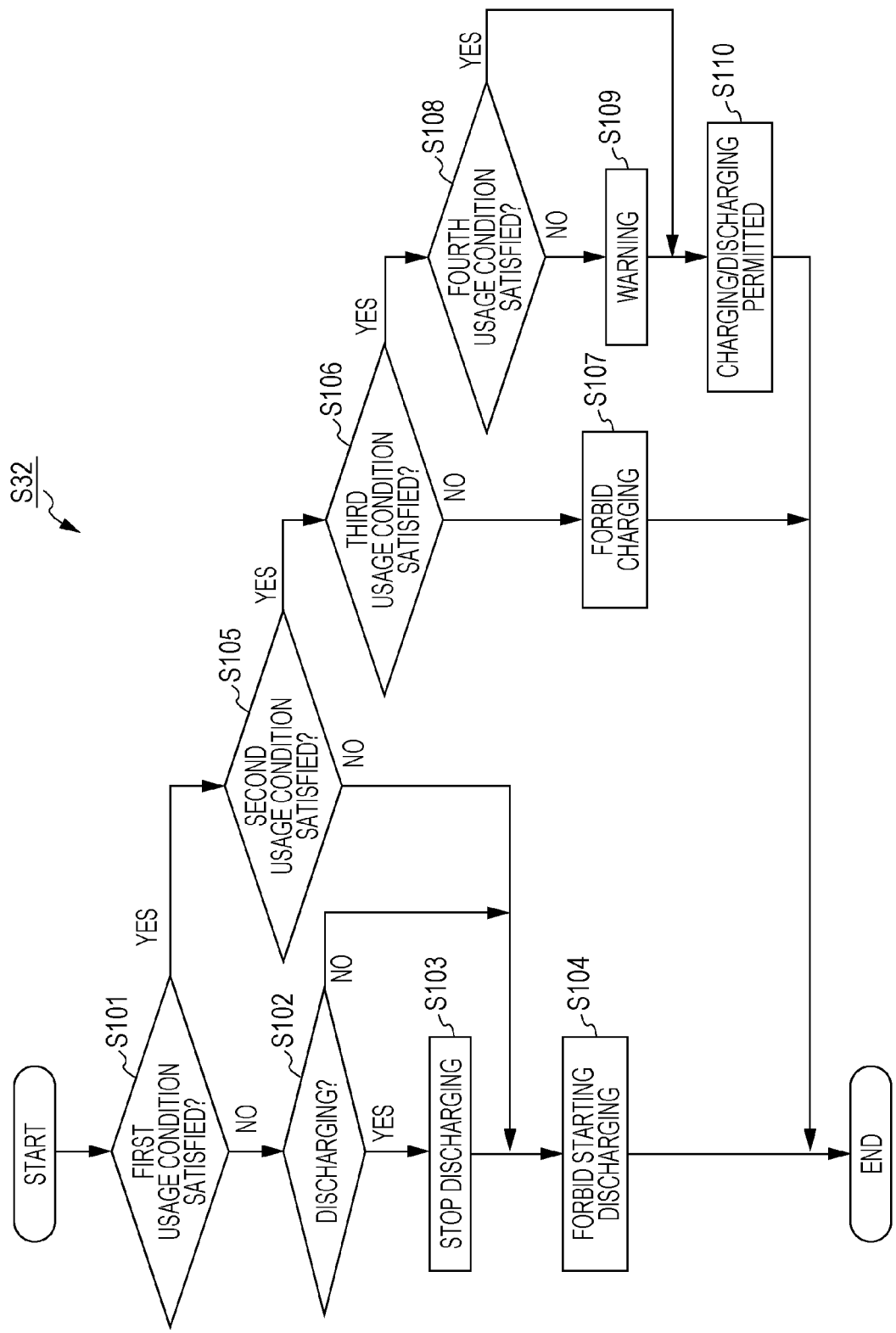
FIG. 8 is a flowchart illustrating usage suspension processing of a battery pack according to an embodiment.

Next, usage suspension processing of the battery pack 50 will be described with reference to FIGS. 7 and 8. FIG. 7 is a diagram illustrating usage suspension processing of the battery pack 50 in the rental system according to the embodiment. This usage suspension processing may be performed at a predetermined cycle, for example. Alternatively, the usage suspension processing may be performed at timings such as, for example, starting discharging of the battery pack 50, ending discharging, starting charging, ending charging, or the like.

First, the server device 11 determines whether or not the usage state of the battery pack 50 satisfies usage conditions of the rental service of the battery pack 50 (S31). A first usage condition through a fourth usage condition are used as usage conditions in the present embodiment. the server device 11 transmits information indicating the determination results to the battery pack 50 via the information terminal 40.

The battery pack 50 executes processing of warning or usage suspension, in accordance with the information indicating the determination results received from the server device 11 (S32).

Details of the warning or usage suspension processing will be described with reference to FIG. 8. FIG. 8 is a flowchart illustrating usage suspension processing of the battery pack 50 according to the embodiment.

In a case where the usage state of the battery pack 50 does not satisfy the first usage condition (No in S101), the control unit 55 determines whether or not the battery 51 is discharging (S102). That is to say, upon acquiring information from the server device 11 via the information terminal 40 and communication unit 52 that the usage state of the battery pack 50 does not satisfy the first usage condition, the control unit 55 determines whether or not the battery 51 is discharging.

The first usage condition in the present embodiment is that the battery pack 50 is returned by the return due date. That is to say, the first usage condition is that the return due date of the battery pack 50 is kept.

For example, if the current date is already past the return due date of the battery pack 50 that has been rented, determination is made that the first usage condition for the usage state of the battery pack 50 has not been satisfied. In other words, determination is made that the usage state of the battery pack 50 does not satisfy the usage conditions if the battery pack 50 has not been returned at the point of the return due date of the battery pack 50. Conversely, if the return due date for the battery pack 50 being rented has not yet arrived as of the current date, determination is made that the usage state of the battery pack 50 satisfies the first usage condition. Alternatively, determination may be made that the usage state of the battery pack 50 satisfies the usage condition if the battery pack 50 has been returned before the return due date, i.e., if the return date is earlier than the return due date of the battery pack 50. The return due date field in the first management table 11a, for example, is referenced for determination of the first usage condition here.

If the battery pack 50 is discharging (Yes in S102), the control unit 55 stops the discharging of the battery pack 50 by controlling the input/output unit 54 (S103). The control unit 55 then controls the input/output unit 54 to forbid the battery pack 50 from starting discharging (S104). That is to say, the control unit 55 controls the input/output unit 54 to stop discharging of the battery pack 50, and thereafter does not permit discharging of the battery pack 50 to start even if there is a discharge start request for the battery pack 50. On the other hand, if the battery pack 50 is not discharging (No in S102), the control unit 55 controls the input/output unit 54 to forbid discharging of the battery pack 50 from starting (S104).

In a case where the usage state of the battery pack 50 satisfies the first usage condition (Yes in S101), but the usage state of the battery pack 50 does not satisfy the second usage condition (No in S105), the control unit 55 forbids the battery pack 50 from starting discharging (S104). That is to say, upon acquiring information from the server device 11 via the information terminal 40 and communication unit 52 that the usage state of the battery pack 50 does not satisfy the second usage condition, the control unit 55 does not permit discharging of the battery pack 50 to start even if there is a discharge start request for the battery pack 50. In other words, if the usage state of the battery pack 50 does not satisfy the second usage condition, the control unit 55 does not stop discharging of the battery pack 50 that is underway as long as the usage state of the battery pack 50 satisfies the first usage condition.

The second usage condition in the present embodiment is to transmit the usage state of the battery pack 50 to the server device 11 by the update due date of the battery pack 50. That is to say, the second usage condition is that the update due date is kept.

For example, if the current date is already past the update due date of the battery pack 50 that has been rented, determination is made that the second usage condition of the battery pack 50 has not been satisfied. In other words, determination is made that the usage state of the battery pack 50 does not satisfy the usage conditions if information indicating the state of the battery pack 50 has not been transmitted to the server device 11 at the point of the update due date of the battery pack 50. Conversely, if the update due date has not yet arrived, determination is made that the usage state of the battery pack 50 satisfies the second usage condition. Alternatively, determination may be made that the usage state of the battery pack 50 satisfies the usage condition if information indicating the state of the battery pack 50 has been transmitted to the server device 11 before the update due date, i.e., if the update date is earlier than the update due date. The update due date field in the first management table 11a, for example, is referenced for determination of the second usage condition here.

Note that the update due date may be updated when the state information of the battery pack 50 is transmitted to the server device 11. That is to say, the update due date may be updated to a new future update due date when the server device 11 receives the state information of the battery pack 50. In this case, if state information of the battery pack 50 is transmitted to the server device 11 after determination is made that the second usage condition is not satisfied, determination will be made thereafter that the second usage condition is satisfied until the current date is after the new update due date.

In a case where the usage state of the battery pack 50 satisfies the second usage condition (Yes in S105), but the usage state of the battery pack 50 does not satisfy the third usage condition (No in S106), the control unit 55 controls the input/output unit 54 to forbid the battery pack 50 from being charged (S107). That is to say, upon acquiring information from the server device 11 via the information terminal 40 and communication unit 52 that the usage state of the battery pack 50 does not satisfy the third usage condition, the control unit 55 does not permit charging of the battery pack 50 even if there is a charge request for the battery pack 50.

The third usage condition in the present embodiment is to use the battery pack 50 a recommended usage amount or more within a predetermined period. In other words, the third usage condition is that the usage amount of the battery pack 50 within a predetermined period is the recommended usage amount or more. The predetermined period is a period having a predetermined time span, and is not restricted in particular. The recommended usage amount is a usage amount recommended to promote usage of the battery pack 50.

For example, if the usage amount of the battery pack 50 that has been rented within the predetermined period is less than the recommended usage amount, determination is made that the third usage condition of the battery pack 50 has not been satisfied. Conversely, if the usage amount of the battery pack 50 that has been rented is the recommended usage amount or more, determination is made that the usage state of the battery pack 50 satisfies the third usage condition. The usage amount field in the first management table 11a, for example, is referenced for determination of the third usage condition here.

Note that the third usage condition may be for the user 100 to have enough or more points, usable as usage fees for the battery pack 50, to cover the amount of points necessary to use the battery pack 50. The amount of points necessary to use the battery pack 50 is a number larger than zero. For example, the amount of points necessary to use the battery pack 50 is the points corresponding to the usage amount in the first management table 11a. Alternatively, the amount of points necessary to use the battery pack 50 may be a preset amount of points of which the value is larger than zero.

For example, if the amount of points the user 100 currently has is less than the amount of points necessary to use the battery pack 50, determination is made that the third usage condition of the battery pack 50 has not been satisfied. Conversely, if the if the amount of points the user 100 currently has is not less than the amount of points necessary to use the battery pack 50, determination is made that the usage state of the battery pack 50 satisfies the third usage condition. The second management table 11b, for example, is referenced for determination of the third usage condition here.

In a case where the usage state of the battery pack 50 satisfies the third usage condition (Yes in S106), but the usage state of the battery pack 50 does not satisfy the fourth usage condition (No in S108), the control unit 55 controls the warning unit 57 to warn the user 100 (S109), and permits charging/discharging (S110). That is to say, upon acquiring information from the server device 11 via the information terminal 40 and communication unit 52 that the usage state of the battery pack 50 does not satisfy the fourth usage condition, the control unit 55 issues a warning to the user 100. An example of a warning is to standby starting of discharging when there is a discharge start request for the battery pack 50. If the usage state of the battery pack 50 satisfies the fourth usage condition (Yes in S108), the control unit 55 permits charging/discharging without issuing a warning (S110).

The fourth usage condition in the present embodiment is that the state information of the battery pack 50 is transmitted to the server device 11a predetermined amount of time before the update due date of the battery pack 50. In this case, the fourth usage condition enters a non-satisfied state before the second usage condition enters a non-satisfied state. Accordingly, the control unit 55 can warn the user 100 before starting charging/discharging of the battery pack 50 is forbidden. In other words, the control unit 55 can control the warning unit 57 and warns the user 100 before controlling the input/output unit 54 and suspending usage of the battery pack 50.

Returning Processing of Battery Pack

Figure 9:
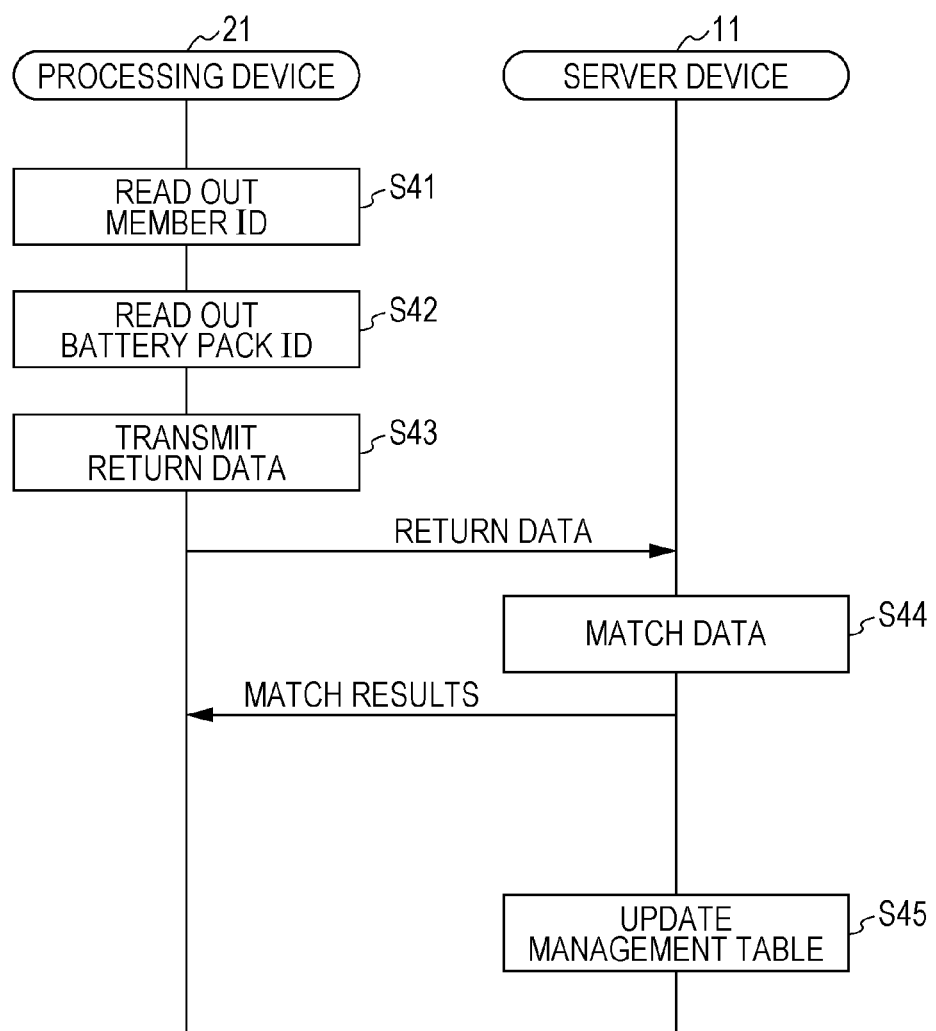
FIG. 9 is a diagram illustrating returning processing of a battery pack in the rental system according to an embodiment.

Next, the processing of returning the battery pack 50 will be described with reference to FIG. 9. FIG. 9 is a diagram illustrating returning processing of a battery pack 50 in the rental system according to the embodiment.

The user 100 presents the membership card at the service center 20 when returning the battery pack 50. The processing device 21 reads out the member ID from the membership card via the card reader 22 (S41). Further, the processing device 21 reads out the battery pack ID from the battery pack 50 being returned, via the inspection device 23 (S42). The inspection device 23 may perform an inspection of the battery pack 50 at this time.

The processing device 21 then transmits return data to the server device 11 (S43). The return data includes at least the member ID and battery pack ID. The return data may further include data relating to the usage amount of the battery pack 50.

The server device 11 receives the return data from the processing device 21, and matches the pair of member ID and battery pack ID included in the return data at the first management table 11a (S44). The match results are transmitted to the processing device 21.

If the match results of the pair of member ID and battery pack ID indicate that matching has been successful, the server device 11 updates the first management table 11a (S45). Specifically, the server device 11 registers the current date in the return date field of the record extracted using the pair of the member ID and battery pack ID.

Advantages

As described above, according to the battery pack 50 of the present embodiment, usage of the battery pack 50 can be suspended when the usage state of the battery pack 50 does not satisfy the usage conditions of the rental service for the battery pack 50. That is to say, the user 100 can be penalized if rules relating to usage of the battery pack 50 are not kept. This can suppress occurrence of situations where the usage state of the battery pack 50 does not satisfy the usage conditions, and inappropriate usage of the battery pack 50 can be suppressed.

Also, according to the battery pack 50 of the present embodiment, in a case where the usage state of the battery pack 50 does not satisfy the first usage condition of the rental service for the battery pack 50, discharging of the battery pack 50 can be stopped while discharging, and thereafter starting discharging not being permitted even if there is a discharge start request. That is to say, discharging of the battery pack 50 can be stopped while discharging, if rules relating to usage of the battery pack 50 are not kept. Usage of the electric equipment 30 to which the battery pack 50 has been mounted is strictly restricted, so inappropriate usage of the battery pack 50 can be strongly suppressed.

Further, according to the battery pack 50 of the present embodiment, in a case where the usage state of the battery pack 50 does not satisfy the second usage condition of the rental service for the battery pack 50, discharging can be not permitted even if there is a discharge start request. That is to say, discharging of the battery pack 50 can be forbidden from the next time, if rules relating to usage of the battery pack 50 are not kept. Accordingly, inappropriate usage of the battery pack 50 can be suppressed, while avoiding danger to the user 100 of the electric equipment 30 due to discharging of the battery pack 50 being stopped while discharging.

Moreover, according to the battery pack 50 of the present embodiment, in a case where the usage state of the battery pack 50 does not satisfy the third usage condition of the rental service for the battery pack 50, charging can be not permitted even if there is a charge start request. That is to say, charging of the battery pack 50 can be forbidden if rules relating to usage of the battery pack 50 are not kept. In other words, discharging of the electric power already stored in the battery pack 50 is permitted, so the battery pack 50 can be gradually guided to stopping discharging. Accordingly, inappropriate usage of the battery pack 50 can be suppressed, while avoiding inconvenience to the user 100.

According to the battery pack 50 of the present embodiment, returning the battery pack 50 by the return due date of the battery pack 50 can be used as the first usage condition. Accordingly, occurrence of a situation where the battery pack 50 is not returned by the return due date can be suppressed.

According to the battery pack 50 of the present embodiment, transmitting information indicating the state of the battery pack 50 to the server device 11 by the update due date of the battery pack 50 can be used as the second usage condition. Accordingly, occurrence of a situation where information indicating the state of the battery pack 50 is not transmitted by the update due date can be suppressed.

According to the battery pack 50 of the present embodiment, using the battery pack 50 a recommended usage amount or more within a predetermined period can be used as the third usage condition. Accordingly, occurrence of a situation where the rented battery pack 50 is only used a little can be suppressed. That is to say, usage of the battery pack 50 can be promoted.

According to the battery pack 50 of the present embodiment, the user 100 having enough or more points, usable as usage fees for the battery pack 50, to cover the amount of points necessary to use the battery pack 50 can be used as the third usage condition. Accordingly, occurrence of a situation where the user 100 cannot pay the usage fee due to insufficient points, when using points as the usage fee for the battery pack 50, can be suppressed. Further, according to the battery pack 50 of the present embodiment, points can be invalidated when the expiration date of the points expires, so appropriate point management can be realized.

According to the battery pack 50 of the present embodiment, the user 100 can be warned before suspending usage of the battery pack 50. Accordingly, usage state of the battery pack 50 can be improved before the usage state of the battery pack 50 no longer satisfies the usage conditions of the rental service of the battery pack 50, and inappropriate use of the battery pack 50 can be suppressed.

According to the battery pack 50 of the present embodiment, the user 100 can be warned by standby of starting discharging when there is a discharge start request of the battery pack 50, thereby enabling the warning to be communicated to the user 100 in a surer manner.

According to the battery pack 50 of the present embodiment, information indicating that the usage state does not satisfy the usage conditions can be acquired from the server device 11 via the information terminal 40 and communication unit 52. That is to say, the battery pack 50 can acquire information from the server device 11 using the communication functions of the information terminal 40. As a result, acquisition of information from the server device 11 can be realized more easily than a case where the battery pack 50 receives information from the server device 11 without going through the information terminal 40.

According to the battery pack 50 of the present embodiment, the communication unit 52 can communicate with the information terminal 40 by NFC. Accordingly, acquisition of information from the server device 11 can be realized more easily, using NFC functions that the information terminal 40 such as a smartphone or the like commonly has.

Other Embodiments

Although a battery pack according to one or multiple forms has been described above based on an embodiment, the present disclosure is not restricted to this embodiment. Modifications of the embodiment conceivable by one skilled in the art may be included in one or multiple forms, without departing from the essence of the present disclosure.

Although the communication unit 52 of the battery pack 50 has been described in the embodiment as wirelessly communicating with the information terminal 40, this is not restrictive. For example, the communication unit 52 may be a second communication unit that wirelessly communicates with the server device 11. Alternatively, for example, the communication unit 52 may have both a first communication unit that communicates with the information terminal 40 and a second communication unit that wirelessly communicates with the server device 11.

According to this configuration, information indicating that the usage state does not satisfy usage conditions can be acquired from the server device 11 via the communication unit 52. That is to say, the battery pack 50 can acquire information from the server device 11 without going through the information terminal 40. Thus, information can be acquired from the server device 11 even when the battery pack 50 cannot communicate with the information terminal 40, and acquisition of information from the server device 11 can be performed in a surer manner.

While the above embodiment describes, as methods to suspend usage of the battery pack 50, (i) stopping discharging during discharging, and not permitting starting discharging even if here is a discharge start request, (ii) not stopping discharging during discharging, but not permitting starting discharging even if here is a discharge start request, and (iii) not permitting starting charging even if here is a charge start request, these are not restrictive. For example, a combination of two of the above (i) through (iii) may be used as one method, such as suspending use of the battery pack 50 by (ii) not stopping discharging during discharging, but not permitting starting discharging even if here is a discharge start request, and (iii) not permitting starting charging even if here is a charge start request.

Although four usage conditions (first usage condition through fourth usage condition) are used in the above embodiment, this is not restrictive. Just one or several of the four usage conditions may be used. For example, an arrangement may be made where only the first usage condition is used. In this case, it is sufficient for charging/discharging to be permitted (S110) as long as the first usage condition is satisfied (Yes in S101) in FIG. 8. In the same way, arrangements may be made where only the second usage condition, only the third usage condition, or only the fourth usage condition, is used.

Note that each of the four usage conditions in the above embodiment are only exemplary, and are not restrictive. For example, the first usage condition may be used as the second usage condition. As another example, a combination of the first usage condition and the second usage condition may be used as the first usage condition. As yet another example, the fourth usage condition may be to return the battery pack 50 by a predetermined amount of time before the return due date. As a further example, the fourth usage condition may be for the usage temperature of the battery pack 50 to not exceed a threshold temperature. As yet another example, the fourth usage condition may be for shock abnormality to have not occurred at the battery pack 50.

Although the server device 11 is described in the above embodiment as performing the determination of usage conditions, but this is not restrictive. For example, the battery pack 50 may determine the usage conditions, as long as they are usage conditions relating to the state of the battery pack 50 (e.g., usage temperature, amount of use, shock abnormality, etc.).

Although description has been made in the above embodiment that the return due date, state information update due date, and point expiration date, are managed in increments of days, these may be managed in days and hours.

Note that the configuration of the battery pack 50 in the above embodiment is exemplary, and is not restricted to the configuration illustrated in FIG. 2. For example, it is sufficient for the battery pack 50 to have at least the input/output unit 54 and control unit 55.

Note that the configuration of the multiple terminals 53 in the above embodiment is exemplary, and does not have to be configured as illustrated in FIG. 2. For example, the discharge terminal 53*a* and the charging terminal 53*b* may be realized by one terminal. Also, for example, the communication terminal 53*c* and the ID terminal 53*d* may be realized by one terminal.

Although description has been made in the above embodiment that usage of the battery pack 50 is suspended if the battery pack 50 is not returned by the return due date, there is no need to suspend usage in each and every case. For example, an arrangement may be made where usage is not suspended even if the battery pack 50 is not returned by the return due date, as long as the usage amount of the battery pack 50 is no less than the recommended usage amount of the battery pack 50 within a predetermined period. According to this arrangement, a user who uses the battery pack 50 no less than the recommended usage amount does not have usage suspended even after the return due date, so the trouble of returning is reduced and the battery pack 50 can still be used, thereby enabling usage of battery packs to be promoted.

The present disclosure is applicable to a battery pack used in a rental service.

What is claimed is:

1. A battery pack comprising:
   a battery;
   a switchover switch that establishes or breaks an electrical connection between the battery and an external device, the external device configured to receive a charge from the battery;
   a connector that physically and electrically connects between the battery pack and the external device and detachably to the external device; and
   a processor that controls the switchover switch to break the electrical connection between the battery and the external device when a usage state of the battery pack does not satisfy a usage condition of rental service of the battery pack, such that the external device is unable to receive the charge from the battery in response to a discharge start request from the external device,
   wherein the battery, the switchover switch, and the processor are built in the battery pack,
   wherein the usage condition includes that a due date for updating information, stored in a server, indicating a state of the battery pack does not lapse by transmitting the information from the battery pack to the server or the information indicating the state of the battery pack is transmitted from the battery pack to the server device by the due date for updating the information, and
   wherein the due date for updating information is used as the usage condition.

2. The battery pack according to claim 1,
   wherein the processor does not permit the battery to discharge by causing the switchover switch to maintain a broken electrical connection between the battery and the external device.

3. The battery pack according to claim 1,
   wherein, when the usage state of the battery pack does not satisfy the usage condition while the battery pack is performing a discharging operation, the processor controls the switchover switch to maintain the established electrical connection between the battery and the external device until the discharging operation is terminated.

4. The battery pack according to claim 1,
   wherein the processor does not permit the battery to charge by causing the switchover switch to maintain a broken electrical connection between the battery and the external device.

5. The battery pack according to claim 1,
   wherein the usage condition includes that a return due date to a lender for the battery pack does not lapse or the battery pack is returned by the return due date to the lender.

6. The battery pack according to claim 1,
   wherein the processor controls the switchover switch to maintain an established electrical connection between the battery and the external device as long as the battery pack is used beyond a recommended usage amount of electrical charge for the battery pack within a predetermined period.

7. The battery pack according to claim 1,
   wherein the usage condition includes that the battery pack is used beyond a recommended usage amount for the battery pack within a predetermined period, the usage amount for the battery pack being an amount of electric power provided from the battery pack to an electric equipment.

8. The battery pack according to claim 1,
   wherein the usage condition includes that a user of the battery pack has points necessary to use the battery pack where the points are usable as usage fees for the battery pack.

9. The battery pack according to claim 8,
   wherein the points are invalidated after an expiration date of the points.

10. The battery pack according to claim 1, further comprising:
    a warning circuit that warns a user,
    wherein the processor causes the warning circuit to warn the user before controlling the switchover switch to break the electrical connection between the battery and the external device.

11. The battery pack according to claim 1, further comprising:
    a warning circuit that warns a user,
    wherein the processor causes the warning circuit to warn the user to standby for starting of discharging the discharge start request for the battery pack is received before controlling the switchover switch to break the electrical connection between the battery and the external device.

12. The battery pack according to claim 1, further comprising:
    a first communication circuit that acquires information from a server device via an information terminal, the information indicating that the usage state does not satisfy the usage condition, wherein the processor controls the switchover switch to break the electrical connection between the battery and the external device in response to the acquired information.

13. The battery pack according to claim 12,
    wherein the first communication circuit communicates with the information terminal by near-field communication.

14. The battery pack according to claim 1, further comprising:
    a second communication circuit that acquires information from a server device, the information indicating that the usage state does not satisfy the usage condition, wherein the processor controls the switchover switch to break the electrical connection between the battery and the external device in response to the acquired information.

15. The battery pack according to claim 1, wherein the processor stops a discharge of the battery during a discharging operation by causing the switchover switch to break the electrical connection between the battery and the external device.

16. The battery pack according to claim 1, wherein a warning notification is provided based on a type of the usage condition.

17. The battery pack according to claim 1, a determination of the usage state of the battery pack is performed prior to usage of the battery to prevent starting of charging or discharging of the battery.

18. The battery pack according to claim 1, wherein the battery pack is associated with a specific member identifier.

19. The battery pack according to claim 1, wherein the processor controls the switchover switch to break the electrical connection between the battery and the external device after the electrical connection between the battery and the external device is initially established to cause the battery to charge or discharge.

20. A control method of a battery pack, the method comprising:
controlling a switchover switch to break an electrical connection between a battery of the battery pack and an external device when a usage state of the battery pack does not satisfy a usage condition of rental service of the battery pack, such that the external device is unable to receive the charge from the battery in response to a discharge start request from the external device,
wherein the battery pack is detachable to the external device via a connector that physically and electrically connects between the battery pack and the external device,
wherein the battery and the switchover switch are built in the battery pack,
wherein the usage condition includes that a due date for updating information, stored in a server, indicating a state of the battery pack does not lapse by transmitting the information from the battery pack to the server or the information indicating the state of the battery pack is transmitted from the battery pack to the server device by the due date for updating the information, and
wherein the due date for updating information is used as the usage condition.

* * * * *